Feb. 17, 1925.
LE ROY BALAAM
METHOD FOR MOLDING BLOCKS
Filed April 18, 1922
1,526,893
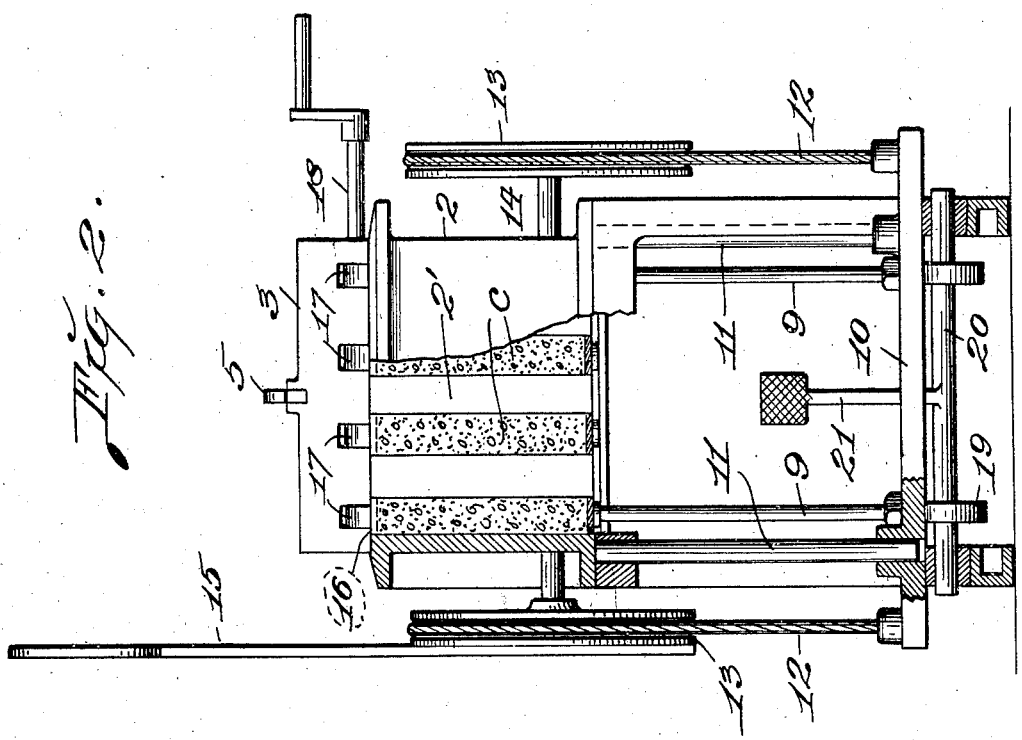
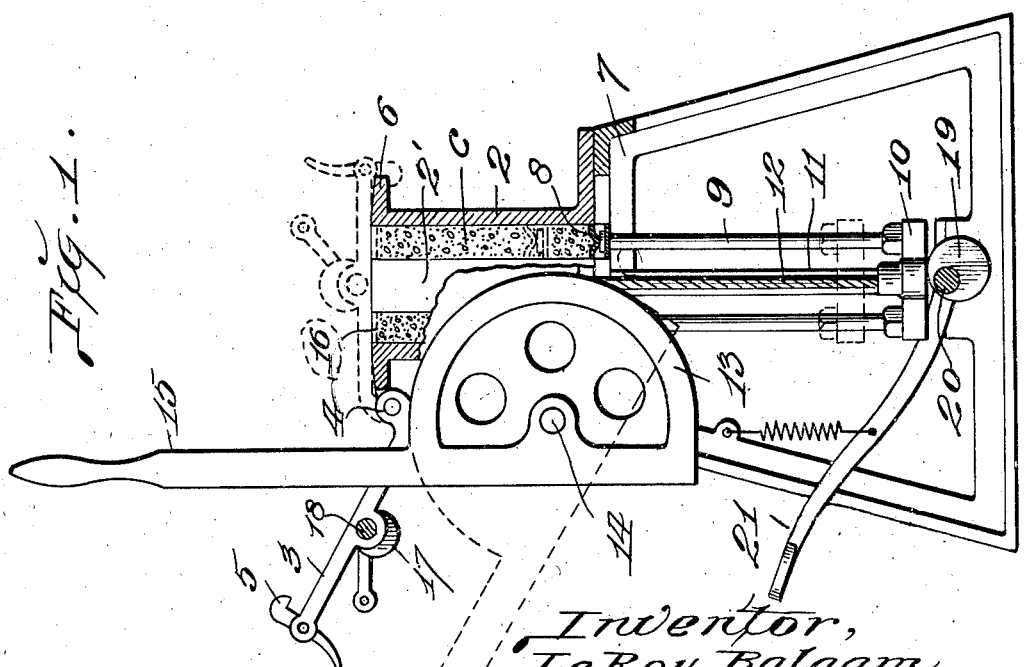
Inventor,
LeRoy Balaam,
By Hazard & Miller
Attys.

Patented Feb. 17, 1925.

1,526,893

UNITED STATES PATENT OFFICE.

LE ROY BALAAM, OF LOS ANGELES, CALIFORNIA.

METHOD FOR MOLDING BLOCKS.

Application filed April 18, 1922. Serial No. 555,187.

*To all whom it may concern:*

Be it known that I, LE ROY BALAAM, a citizen of the United States, residing at Los Angeles, in the county of Los Angeles and State of California, have invented new and useful Improvements in Methods for Molding Blocks, of which the following is a specification.

My invention relates to a method for facilitating the manufacture of cementitious blocks, pipes and other articles of various forms and sizes.

It is one of the objects of the present invention to provide for the production of a thoroughly homogeneous body in blocks, whether hollow or solid, which are produced of plastic material and are subjected to pressure before the cementitious material has materially set or hardened.

The method involves the subjection of the plastic material in molds, or containers, to a vibratory or jolting action so as to insure the removal of air chambers within the fluid substance and thus to produce a solid hardened product. The method may be practiced by the vibration or jolting of the plastic material in a container. Further, the plastic material after it has been vibrated or jolted is subjected to pressure and the compressed article is then removed from its container.

The method is hereinafter described and illustrated in the accompanying drawings, in which Fig. 1 is a partial elevation and partial section vertically of a form of apparatus for jolting or vibrating the material in its mold chamber.

Fig. 2 is a front elevation, partly broken away, of the structure of Fig. 1.

An important step in my present method for the manufacture of concrete blocks, which may be solid or hollow, consists in subjecting the plastic material to a jolting or jogging action before the material has hardened while in the mold chambers.

As shown in Figs. 1 and 2, the plastic cement C is charged into the chamber or chambers of a mold 2, which is shown as set in upright position and has an open mouth over which may be closed a cover member 3 which may be thrown open about its hinge or pivot 4 on the upper end of the mold 2. The cover 3 is adapted to be fastened in the closed position as by a latch 5 to engage a contiguous lug 6 provided at the top of the mold 2.

The mold may be provided upon any suitable frame-work 7 and is open at its lower end to receive a follower head or ram 8 which is provided upon the upper ends of push rods 9, the lower ends of which are fixed in a crosshead 10. This is slidably mounted upon guide-posts 11 whose upper ends are suitably secured in the frame structure 7.

The apparatus of Figs. 1 and 2 is shown as designed for the manufacture of hollow cement blocks and therefore there is arranged in the chamber of the mold 2 a series of cores 2' spaced well from the side and end walls and from each other to provide a filling space for the cement C.

To impart a jolting and vibratory action to the cement C in the chamber 2, means are provided for raising and lowering the ramhead 8 which is made of a form, in plan, to conform to the area of the chamber or space horizontally across the mold 2, and which ramhead also snugly surrounds the cores 2'. The ramhead is designed to be quickly lifted and lowered in short or long strokes, as may be desired, to reciprocate the plastic cement C and this is accomplished as by means of elevating cables 12 attached to the ends of the crosshead 10 and passing up over and around a section of a pulley 13, of which there is one for each cable 12, fastened on each end of a shaft 14, journaled on the upper part of the frame 7. The shaft is oscillated as by means of a hand lever 15, in this case shown as attached to one of the segmental pulleys 13.

While the cover 3 of the mold 2 is in the open position, Fig. 1, cement is charged into the mold to a suitable degree and it is then vertically lifted and permitted to fall under the action of gravity by the reciprocation of the ramhead 8 forming the bottom of the mold chamber, this being accomplished by oscillating the handle 15 which raises and lowers the crosshead 10 to which the ramhead is connected.

After the cement has been thoroughly jolted to insure the escape of air bubbles and to make a homogeneous mass, the top cover 3 is lowered and latched while the ramhead is held in such position as to hold the top level of the cement adjacent to the top of the mold. Then top pressure is applied to the cement C as by means of a presser plate 16 arranged in the top of the mold chamber 2 and conforming to its horizontal outline. The presser plate is designed to be engaged and forced downwardly by suitable means shown as comprising a set of eccentrics 17 fast on a shaft 18 journaled in the cover member 3. While top pressure may be applied to the presser plate 16 effective upon the upper portion of the plastic cement, at the same time bottom pressure may be applied to the cement as by means of eccentrics 19 secured on the shaft 20 journaled in the bottom of the frame 7, and which may be actuated by a treadle lever 21. The eccentrics are arranged to engage the crosshead 10 as the treadle 21 is pressed down by the operator and thus the ramhead 8 is forced upwardly either concurrently with downward pressure by presser plate 16, or the bottom pressure may be applied before or after the top pressure. Thereafter the cover 3 is lifted and the presser plate 16 removed and the compacted block is ejected by throwing the hand lever 15 around to its maximum stroke to lift the crosshead and thereby the ramhead 8 so that the latter carries the block to the top of the mold chamber.

In a companion application filed March 17th, 1922, Serial No. 544,481, for block molding apparatus, allowed Sept. 14, 1923 and issued Apr. 1st, 1924, Patent Number 1,488,644 we have shown, described and claimed the apparatus shown and described herein and do not wish to make such claims herein.

Various changes may be made without departing from the spirit of the invention as claimed.

What is claimed is:

1. In the manufacture of objects from plastic, cementitious material, the method which consists of subjecting the plastic material in a stationary mold chamber to a vibratory action from the bottom; then compressing the material by the application of pressure means in the mold chamber from both the top and bottom, then relieving the pressure upwardly, and ultimately ejecting the compressed object from the mold chamber.

2. In the manufacture of objects from plastic, cementitious material, the method which consists of subjecting the plastic material in a stationary mold chamber to a vibratory action from the bottom; then compressing the material by the application of pressure means in the mold chamber, then relieving the pressure, and ultimately ejecting the compressed object from the mold chamber, the pressure being applied in alternate steps, first upon one and then upon the other end of the object being molded.

3. In the manufacture of objects from cementitious, plastic material, the method which consists of introducing the plastic material into a stationary mold chamber; subjecting the material to a vibratory action from the bottom; supporting the material therein by a fixed abutment at the upper end of the chamber and compressing the material by the application of means movable in the lower end of the chamber.

4. In the manufacture of objects from cementitious, plastic material, the method which consists of introducing the plastic material into a stationary mold chamber; subjecting the material to a vibratory action from the bottom; supporting the material therein by a fixed abutment at the upper end of the chamber and compressing the material by the application of means movable in the opposite end of the chamber and then reversing the compressive action to the opposite end of the object being molded.

In testimony whereof I have signed my name to this specification.

LE ROY BALAAM.